United States Patent
Hasunuma et al.

(10) Patent No.: US 6,356,051 B1
(45) Date of Patent: Mar. 12, 2002

(54) BATTERY PACK AND PTC ELEMENT INCORPORATED IN THE BATTERY PACK

(75) Inventors: Takashi Hasunuma, Narita; Atsushi Watanabe; Kazuo Osaki, both of Hyogo; Fumiyoshi Yoshinari, Tokushima, all of (JP)

(73) Assignees: Tyco Electronics Raychem K.K., Kanagawa; Sanyo Electric Co., Ltd., Osaka, both of (JP)

(*) Notice: Subject to any disclaimer, the term of this patent is extended or adjusted under 35 U.S.C. 154(b) by 0 days.

(21) Appl. No.: 09/508,940
(22) PCT Filed: Sep. 17, 1998
(86) PCT No.: PCT/JP98/04177
§ 371 Date: Aug. 18, 2000
§ 102(e) Date: Aug. 18, 2000
(87) PCT Pub. No.: WO99/14814
PCT Pub. Date: Mar. 25, 1999

(30) Foreign Application Priority Data

Sep. 18, 1997 (JP) .............................................. 9-253781

(51) Int. Cl.⁷ .................................................. H02J 7/00
(52) U.S. Cl. .......................................... 320/107; 429/65
(58) Field of Search .......................... 320/107; 429/52, 429/62, 65, 96, 97

(56) References Cited

U.S. PATENT DOCUMENTS

| 5,801,612 A | * | 9/1998 | Chandler et al. | .......... 338/22 R |
| 5,976,720 A | * | 11/1999 | St. Jean et al. | ................ 429/62 |
| 6,114,942 A | * | 9/2000 | Kitamoto et al. | .............. 429/62 |

FOREIGN PATENT DOCUMENTS

| JP | 2-69440 | 5/1990 |
| JP | 6-38157 | 5/1994 |
| JP | 9-63553 | 3/1997 |
| JP | 9-139195 | 5/1997 |
| JP | 9-213505 A | 8/1997 |
| WO | WO 97/06538 | 2/1997 |

OTHER PUBLICATIONS

European Search Report for European Application No. 98943017.8 dated Nov. 27, 2000.
Japanese International Search Report for International Application No. PCT/JP98/04177 dated Jan. 12, 1999.
Patent Abstracts of Japan, vol. 012, No. 420 (E–679), Nov. 8, 1988 & Japanese Application No. 63 158744A (Nippon Mektron Ltd), Jul. 1, 1988 (abstract only).

* cited by examiner

*Primary Examiner*—Peter S. Wong
*Assistant Examiner*—Lawrence Luk

(57) ABSTRACT

A battery pack and a PTC device are provided that can be used safely under large current loads by increasing the area of the incorporated PTC layer so as to decrease its internal resistance. The battery pack has a plurality of unit cells (1) placed side by side in parallel and the PTC device P to protect the unit cells (1) from overcurrents. The PTC device P has a first electrode (3) and a second electrode (4) connected to the both surfaces of the PTC layer (2). The PTC layer is formed to an outer shape that covers almost the entirety of the end surfaces of the two unit cells (1) to which the first electrode (3) and the second electrode (4) are connected, and has through holes (2B) positioned against the end electrodes (1A) of the unit cells (1). The first electrode (3) and the second electrode (4) connected to the both surfaces of the PTC layer (2) are formed to an outer shape almost the same as the outer shape of the PTC layer (2); and the first electrode (3) and the second electrode (4) are connected to the end electrodes (1A) of the unit cells (1) at points where the through holes (2B) of the PTC layer (2) are located.

14 Claims, 3 Drawing Sheets

BATTERY PACK AND PTC ELEMENT INCORPORATED IN THE BATTERY PACK

TECHNICAL FIELD

The present invention relates to the improvement of a battery pack incorporating a PTC device therein. In particular, the present invention relates to a battery pack and a PTC device incorporated in such battery pack wherein a plurality of unit cells placed side by side in parallel are connected in series with the PTC device.

BACKGROUND ART

PTC devices are incorporated in battery packs as protection devices. The PTC device connected in series with unit cells will, when an overcurrent flows through the cells or a temperature of the cells rises, protect the cells by increasing its electrical resistance rapidly so that the cell current is shut off or reduced to a virtually zero value.

A battery pack having a PTC device connected to unit cells in series is described for example in Japanese Patent Laid-open Publication (Tokkai Hei) No. 9-63553. As shown in FIG. 1, the battery pack described in this publication has the PTC device P connected between two unit cells 1 which are positioned linearly. The PTC device P has a top surface connected to an end electrode 1A of one unit cell 1 and a bottom surface connected to an end electrode 1A of the other unit cell. This structure is suitable for incorporating the PTC device in the battery pack where the unit cells are positioned linearly. However, such a PTC device cannot connect cells in a desirable condition in a battery pack where the unit cells are placed side by side in parallel.

A battery pack incorporating a PTC device and having unit cells placed in parallel is described in Japanese Utility Model Laid-open Publications (Jikkai Hei) Nos. 2-69440 and 6-38157. FIG. 2 shows an exploded perspective view of the battery pack described in the former publication. FIGS. 3 and 4 show the PTC device incorporated in the battery pack and the battery pack incorporating the PTC device as described in the latter publication.

The battery pack shown in FIG. 2 incorporates a PTC device P having a first electrode 3 and a second electrode 4 connected to a bottom surface and a top surface respectively of a rectangular PTC layer 2. The first electrode 3 and the second electrode 4 protrude from the both sides of the PTC layer 2 and are connected to the end electrodes 1A of the unit cells 1. In this structure, the battery pack has the PTC layer 2 between the adjacent electrodes 1A of the cells 1 placed in parallel.

The PTC device P shown in FIG. 3 has a PTC layer 2 which is disk-shaped having an external size which is generally the same as the diameter of the unit cell and which is formed to allow the convex electrode of the cell to be inserted. The PTC layer 2 in this form can be placed around the convex electrode. A plate-shaped first electrode 3 is connected to the bottom surface of the PTC layer 2. In order to insert the convex electrode, the first electrode 3 has a convex-shaped center portion which is inserted into the center hole 2A of the PTC layer 2. A second electrode 4 having a semi-spherical section along the PTC layer 2 and a protruding lead is connected to the top surface of the PTC layer 2. The first electrode 3 is connected to the convex electrode, and the second electrode 4 is, as can be seen in FIG. 4, connected to the end electrode 1A of the adjoining unit cell 1.

The PTC devices shown in FIGS. 2 and 3 are convenient for incorporating in battery packs which have a plurality of unit cells 1 placed in parallel. In particular, the PTC device shown in FIG. 3 is characterized in that it can be placed around the convex electrode so that it hardly protrudes from the unit cell.

However, the battery packs described in those publications are limited by the area of the PTC layer so that it is difficult to make it larger. In the PTC device P shown in FIG. 2, the first electrode 3 and the second electrode 4 cannot be connected to the end electrodes 1A of the unit cells 1 if the PTC layer 2 is made larger. This PTC device P cannot be made wider than the spacing between the end electrodes 1A of the adjoining unit cells 1.

Also, in the PTC device P shown in FIGS. 3 and 4, the outer size of the PTC layer 2 cannot be made greater than the thickness of the unit cell 1. If it is made greater, it would protrude from the cell 1 so that the size of the battery pack is locally increased. Further, the PTC layer 2 in this form has the center hole 2B, which decreases the substantive area of the PTC layer 2 that can be used.

Since the PTC device is used while connected in series with respect to the unit cells, it is important that the internal resistance of the PTC device is small under normal conditions. This is because the PTC device consumes power in proportion to the product of the internal resistance of the PTC layer and the load current squared. Further, in battery packs used for large current applications, the current through the PTC device also increases. The PTC device can be designed to withstand the large currents by increasing the area of the PTC layer. In order to decrease the internal resistance and increase the large current, it is important to make the area of the PTC layer in the PTC device larger. However, battery packs heretofore had a shortcoming in that it was difficult to achieve this.

DISCLOSURE OF THE INVENTION

The present invention has been developed for the purpose of solving this shortcoming. An important purpose of the present invention is to provide a battery pack and a PTC device incorporated in such battery pack which could be used safely under large current loads by increasing the area and decreasing the internal resistance of the PTC layer.

The battery pack according to claim 1 of the present invention has a plurality of unit cells 1 placed side by side in parallel and a PTC device P to protect the cells 1 from overcurrents. The PTC device P has a first electrode 3 and a second electrode 4 attached to both surfaces of the PTC layer 2. The PTC device P is connected in series to the unit cells 1 by connecting the first electrode 3 and the second electrode 4 to the end electrodes 1A of the two unit cells 1 whose end electrodes 1A are positioned on the same or almost the same plane. It is intended that the term "almost" is used to include the concept of "substantially the same plane".

The outer shape of the PTC layer 2 is formed to cover almost the entirety of the end surfaces of the two cells 1 to which the first electrode 3 and the second electrode 4 are connected. Further, the PTC layer 2 has through holes 2B positioned correspondingly to positions of the end electrodes 1A of the cells 1.

The first electrode 3 and the second electrode 4 attached to both surfaces of the PTC layer 2 are formed into an outer shape that is almost the same as the outer shape of the PTC layer 2; and the first electrode 3 and the second electrode 4 are connected to the end electrodes 1A of the unit cells 1 through their portions which are located correspondingly to the through holes 2B of the PTC layer 2.

The PTC device according to claim 5 of the present invention protects the unit cells 1 from the overcurrents by connecting the first electrode 3 and the second electrode 4 which are attached to the both surfaces of the PTC layer 2 to the end electrodes 1A of a plurality of the cells 1 placed side by side in parallel.

The outer shape of the PTC layer 2 is formed to cover almost the entirety of the end surfaces of the two cells 1 to which the first electrode 3 and the second electrode 4 are connected. Further, the PTC layer has the through holes 2B positioned against the end electrodes 1A of the cells 1.

The first electrode 3 and the second electrode 4 connected to both surfaces of the PTC layer 2 are formed into almost the same outer shape as the outer shape of the PTC layer 2; and the first electrode 3 and the second electrode 4 are connected to the end electrodes 1A of the unit cells 1 at points where the through holes 2B of the PTC layer 2 are located.

In the battery pack according to claim 2 and the PTC device according to claim 6 of the present invention, the second electrode 4 connected to the top surface of the PTC layer 2 has a convex section 4A which is inserted into the through hole 2B. The second electrode 4 has the convex section 4A connected to the end electrode 1A of the unit cell 1. It is noted that the top and bottom directions in the present specification are determined based on the drawings.

In the battery pack according to claim 3 and the PTC device according to claim 7 of the present invention, the first electrode 3 connected to the bottom surface of the PTC layer 2 has a convex section 3A protruding from the bottom surface at the position of the through hole 2B of the PTC layer 2. The convex section 3A is connected to the end electrode 1A of the unit cell 1.

The battery pack according to claim 4 of the present invention incorporates cylindrical cells as the unit cells 1, and the outer shapes of the PTC layer 2, the first electrode 3 and the second electrode 4 are rectangularly shaped with the corners bevelled to conform with the cylindrical cells.

Figure 1:
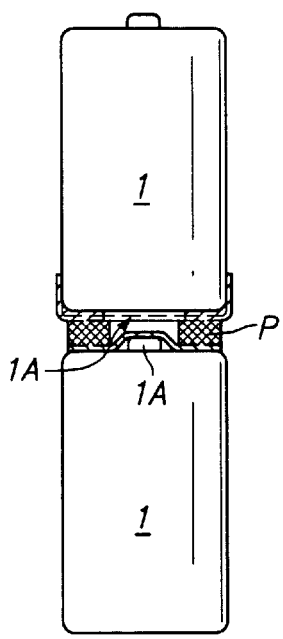
FIG. 1 is a cross-sectional view of a prior art battery pack.
Figure 2:
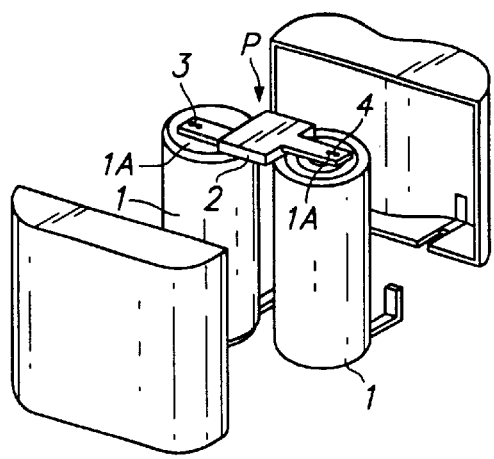
FIG. 2 is an exploded oblique view of another prior art battery pack.
Figure 3:
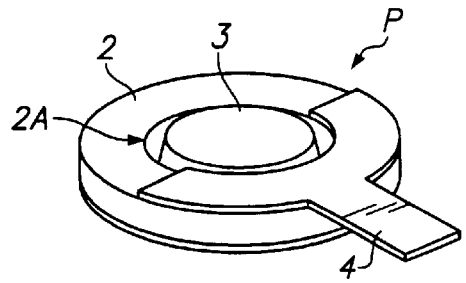
FIG. 3 is an oblique view of a PTC device incorporated in a further prior art battery pack.
Figure 4:
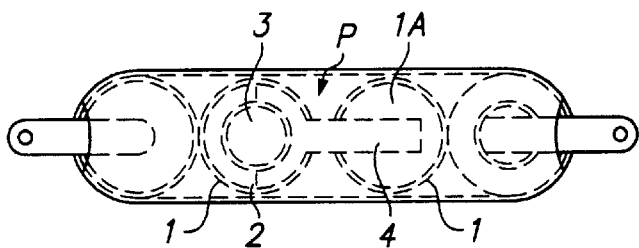
FIG. 4 is a top view of a battery pack incorporating the PTC device shown in FIG. 3.

In the drawings, the reference numbers indicate the following members:
1 . . . Unit cell,
1A . . . End electrode,
1a . . . Flat electrode,
1b . . . Convex electrode,
2 . . . PTC layer,
2A . . . Center hole,
2B . . . Through hole,
3 . . . First electrode,
3A . . . Convex section,
3B . . . Through hole,
4 . . . Second electrode,
4A . . . Convex section,
4B . . . Through hole,
5 . . . Casing,
5A . . . Electrode window,
P . . . PTC device

EMBODIMENTS TO CARRY OUT THE INVENTION

Embodiments of the present invention will be described below based on the drawings. The following embodiments of a battery pack and a PTC device incorporated in the battery pack are given as examples embodying the technical concept of the present invention, and the present invention is not particularly restricted to the battery packs and the PTC devices described below.

Further, in order to facilitate the understanding of the claims, the present specification has indicated, in the "CLAIMS" and the "DISCLOSURE OF THE INVENTION", the reference numbers corresponding to the members shown in the embodiments. However, this by no means restricts the members indicated in the CLAIMS to the members in the embodiments.

Figure 5:
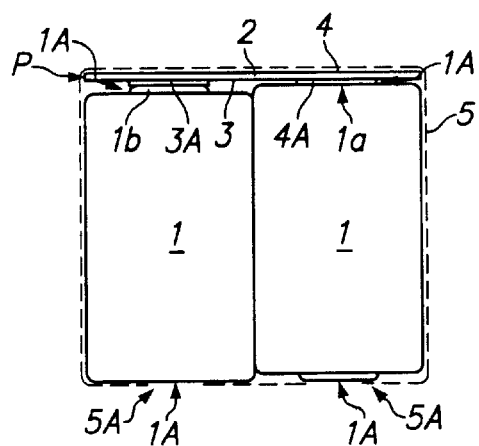
FIG. 5 is a side view of an embodiment of a battery pack according to the present invention.
Figure 6:
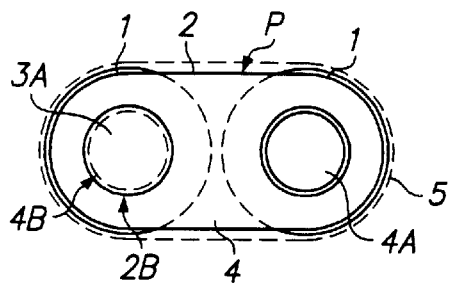
FIG. 6 is a top view of the battery pack shown in FIG. 5.

The battery pack shown in FIG. 5 and FIG. 6 has incorporated in a casing 5 two unit cells 1 and a PTC device P for protecting the cells 1 from overcurrent. The cells 1 are rechargeable (secondary) cells such as a nickel-cadmium cell, a nickel-metal hydride cell, or a lithium ion cell. A feature of the nickel-cadmium cells or the nickel-metal hydride cells is high current charge and discharge. The PTC device P incorporated in the battery pack has the characteristic of increasing its electrical resistance rapidly when the overcurrent flows through the cells 1 or when the temperature of the cells 1 rises, thereby shutting off or drastically decreasing the flow of current through the cells 1.

The casing 5 is a plastic molded part or a heat-shrinkable tubing and covers the unit cells 1 and the PTC device P. The shown casing 5 has electrode windows 5A to expose the end electrodes 1A of the cells 1. In the battery pack according to the present invention, it is also possible to have a construction where, instead of exposing the end electrodes from electrode windows in the casing, lead wires connected to the end electrodes are connected to external electrodes affixed to the casing.

The two unit cells 1 are placed side by side in parallel. The battery pack in the Figures has two cells 1 placed in parallel, but the battery pack according to the present invention may also incorporate three or more unit cells. The two cells 1 are placed so that the end electrodes 1A thereof are on the same or almost the same plane.

Figure 7:
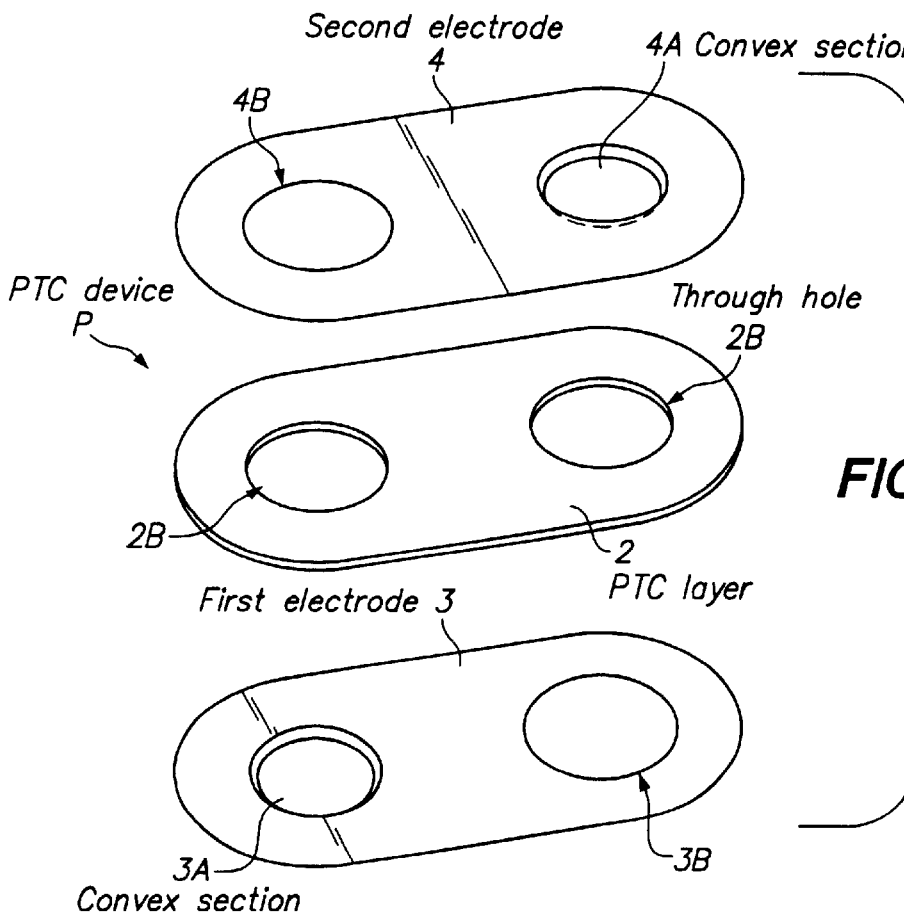
FIG. 7 is an exploded oblique view of a PTC device incorporated in the battery pack shown in FIG. 5.
Figure 8:
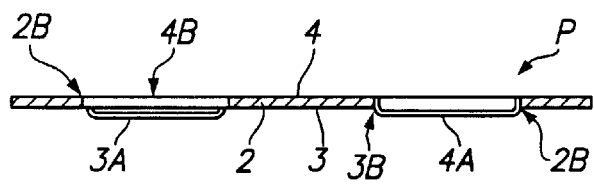
FIG. 8 is a cross-sectional view of a PTC device incorporated in the battery pack shown in FIG. 5.

As shown in the exploded oblique view in FIG. 7, the PTC device P has the first electrode layer 3 on the bottom surface and the second electrode layer 4 on the top surface of the PTC layer 2. The first electrode 3 and the second electrode 4 are bonded to the top and bottom surfaces of the PTC layer 2 so that they are connected electrically. The first electrode 3, the PTC layer 2, and the second electrode 4 are, as can be seen in the cross-sectional view in FIG. 8, intimately attached in a laminated state of three layers.

As can be seen in the top view in FIG. 6 and the exploded oblique view in FIG. 7, the PTC layer 2 has an external shape which is rectangular with the corners bevelled to conform with the cylindrical cells so that the entire end surfaces of the two adjoining unit cells 1 are covered. The external shape of the PTC layer 2 in the Figures is slightly smaller than the external shape of the cylindrical cells which are the cells 1. Although not shown in the drawings, the external shape of the PTC layer can also be slightly larger than the external shape of the cylindrical cells. However, if the PTC layer protrudes considerably from the cells, it would be inconvenient to place in the casing. Therefore, the size of the PTC layer is such that it hardly protrudes from the external shape of the cells.

Figure 9:
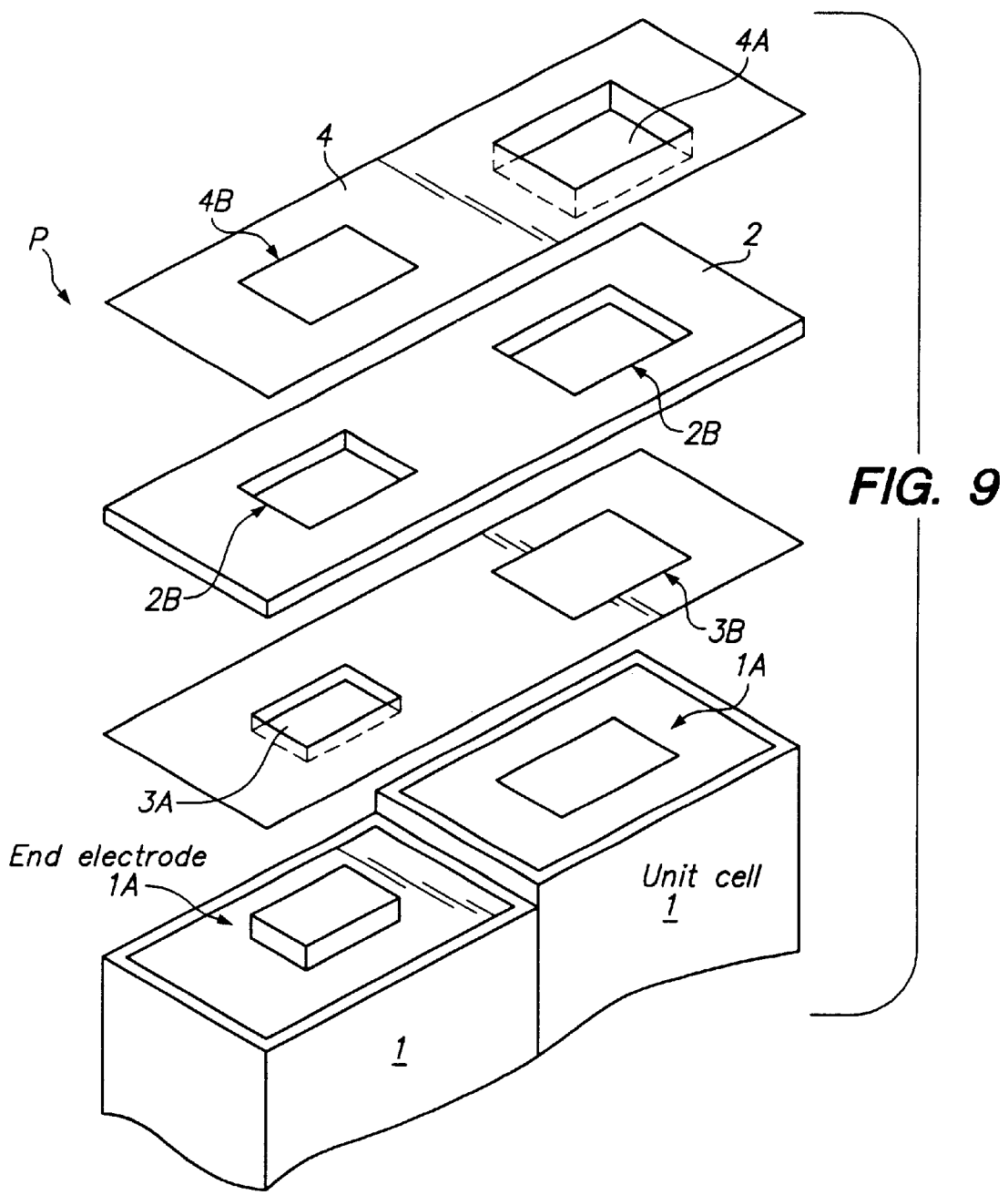
FIG. 9 is an exploded oblique view of another embodiment of the present invention.

The battery pack in the Figures incorporates the cylindrical cells, but there are also battery packs incorporating rectangular cells instead of the cylindrical cells. As can be seen in FIG. 9, in a battery pack incorporating the rectangular cells, the PTC device P is given a rectangular shape in line with the external shape of the rectangular cells to cover the end surfaces of the unit cells 1.

The PTC layer 2 has through hales 2B aligned with the end electrodes 1A of the unit cells 1. The through hales 2B are for connecting the first electrode 3 and the second electrode 4 to the end electrodes 1A of the cells 1, and are made large enough to electrically connect the first electrode 3 and the second electrode 4 to the end electrodes 1A. In the Figures, the size of the through hole 2B in the PTC layer 2 is the same as the external shape of the convex electrode 1b of the cell 1. The through hole, however, does not need to be the same size as the convex electrode; and it can be larger or smaller than the convex electrode. If the through holes is made smaller, the area of the PTC layer can be made larger. However, the smaller through hole would make it difficult to connect the first electrode and the second electrode to the end electrodes over broad areas. Conversely, if the through hole is made larger, the area of the PTC layer would become smaller, but the first electrode and the second electrode can be connected to the end electrodes over broader areas.

The first electrode 3 and the second electrode 4 are connected to the end electrodes 1A of the cells 1 by spot welding. Therefore, the through holes 2B are sized so that the welding electrode can be inserted into the holes to connect the first electrode 3 and the second electrode 4 to the end electrodes 1A. Further, in order to allow the welding electrode to be inserted, the first electrode 3 and the second electrode 4 which are attached to the both surfaces of the PTC layer 2 have through holes 3B and 4B respectively in positions corresponding to the through holes 2B in the PTC layer 2. These through holes 3B and 4B have sizes almost the same as those of the through holes 2B. in the PTC layer 2.

The first electrode 3 and the second electrode 4 in FIG. 7 are of thin metal sheets cut to the same external shape as that of the PTC layer 2. The first electrode 3 protrudes from the bottom surface of the PTC layer 2, where the through hole 2B is positioned, to form a convex section 3A, and this convex section 3A is connected to the end electrode 1A on the cell 1. The convex section 3A has a slightly smaller external shape than that of the through hole 2B.

The second electrode 4 has a convex section 4A formed, which is inserted in the through hole 2B of the PTC layer 2. As this convex section 4A penetrates the PTC layer 2 and protrudes from the bottom surface thereof, the height of the convex section is taller than that of the convex section of the first electrode 3. As shown in FIG 5, the first electrode 3 and the second electrode 4 have the bottom planes of the convex sections 3A and 4A exactly on the same plane. With this configuration, the flat electrode 1a and the convex electrode 1b of the two unit cells 1 are positioned exactly on the same plane, and they can be connected to the first electrode 3 and the second electrode 4.

The battery pack according to the present invention, however, does not need to position the convex sections of the first electrode and the second electrode exactly on the same plane. For example, the first electrode may be flat, or it can be shaped to protrude upwards in FIG. 8, so that the protruding portion may be inserted in the through hole of the PTC layer. The size of the convex section inserted into the through hole in the PTC layer is such that the convex electrode of the unit cell can be inserted; and electrical connection is made with the convex electrode inserted therein.

As shown in the drawings as described above, the first electrode 3 and the second electrode 4 having the same external shape as that of the PTC layer 2 allows for a larger contact area with the PTC layer 2. The first electrode 3 and the second electrode 4 do not need to be the same external shape as that of the PTC layer 2. For example, although not shown in the drawings, the external shape of the first electrode and the second electrode may be slightly smaller or slightly larger than that of the PTC layer.

The battery pack having the construction as described above is assembled in the following manner:

(1) The PTC device P is beforehand assembled with the first electrode 3 and the second electrode 4 attached to the bottom surface and the top surface respectively of the PTC layer 2.

(2) The PTC device P, with the first electrode 3 and the second electrode 4 connected, is placed on the unit cells 1 positioned side by side in parallel. The PTC device P is placed on the two cells so that its perimeter is aligned with the perimeter of the two cells 1.

(3) A welding electrode is inserted into the through holes 2B of the PTC layer 2, and the convex sections 3A and 4A of the first electrode 3 and the second electrode 4 respectively are spot welded and connected to the end electrodes 1A of the cells 1.

(4) The cells 1 connected to the PTC layer 2 are covered with the casing 5 to form the battery pack.

INDUSTRIAL APPLICABILITY OF THE INVENTION

The battery pack and the PTC device incorporated into such battery pack according to the present invention are characterized in that the PTC device has the construction facilitating the connection of the first and second electrodes of the PTC device to the end electrodes of the unit cells, and further that the area of the PTC layer with electrodes attached to both surfaces thereof can be made large without the PTC device protruding considerably from the cells. This is because the battery pack and the PTC device according to the present invention have a unique construction for the PTC layer and the first and second electrodes. The PTC layer is formed in the shape that covers almost the entire end surfaces of the two cells to which the first and second electrodes are connected, and further the PTC layer has the through holes positioned against the end electrodes of the unit cells. The first and second electrodes are connected to the end electrodes of the cells at the positions where the through holes are provided in the PTC layer. With this construction, the battery pack having the PTC layer on the end surfaces of a number of the cells by connecting the first and second electrodes to the end electrodes can make the area of the PTC layer extremely large and dramatically -decrease the internal resistance of the PTC layer. Thus, when the unit cells are used under normal conditions, the current loss of the PTC layer is extremely small and the power of the cells can be supplied effectively to the load. Also, by increasing the area of the PTC layer, a large current can be passed through the PTC layer. Thus, the battery pack and the PTC device incorporated in such battery pack according to the present invention achieve the characteristic of being able to be used safely for the large current loads.

What is claimed is:

1. A battery pack comprising a plurality of unit cells placed side by side in parallel and a PTC device for protecting the unit cells from overcurrents connected in series to the unit cells, such connection being made by connecting a first electrode and a second electrode, which are connected to both surfaces of a PTC layer, to end electrodes of two unit cells which are positioned on the same flat plane, the battery pack being characterized by:

an outer shape of the PTC layer being formed to a shape covering almost the entirety of end surfaces of the two unit cells to which the first electrode and the second electrode are connected, and through holes being positioned in the PTC layer against the end electrodes of the unit cells, the first electrode and the second electrode connected to the PTC layer being formed to an outer shape almost the same as the outer shape of the PTC layer, and the first electrode and the second electrode being connected to the end electrodes of the unit cells at points where the through holes of the PTC layer are located.

2. The battery pack according to claim 1 wherein the second electrode connected to a top surface of the PTC layer has a convex section which is inserted into the through hole of the PTC layer, the convex section being connected to the end electrode of the unit cell.

3. The battery pack according to claim 1 wherein the first electrode connected to a bottom surface of the PTC layer protrudes from the bottom surface where the through hole of the PTC layer is located, and a convex section being connected to the end electrode of the unit cell.

4. The battery pack according to claim 2 wherein the first electrode connected to a bottom surface of the PTC layer protrudes from the bottom surface where the through hole of the PTC layer is located, and a convex section being connected to the end electrode of the unit cell.

5. A PTC device for protecting a plurality of unit cells from overcurrents wherein a first electrode and a second electrode, which are connected to both surfaces of a PTC layer, are connected to end electrodes of the unit cells placed side by side in parallel, and the PTC device being incorporated in a battery pack characterized by a construction wherein:

an outer shape of the PTC layer is formed to a shape covering almost the entirety of end surfaces of two unit cells to which the first electrode and the second electrode are connected, and through holes are positioned in the PTC layer against the end electrodes of the unit cells, the first electrode and the second electrode connected to both surfaces of the PTC layer are formed to an outer shape almost the same as the outer shape of the PTC layer, and the first electrode and the second electrode are connected to the end electrodes of the unit cells at points where the through holes of the PTC layer are located.

6. The PTC device according to claim 5 wherein the second electrode connected to a top surface of the PTC layer has a convex section which is inserted into the through hole of the PTC layer, and the convex section is connected to the end electrode of the unit cell.

7. The PTC device according to claim 5 wherein the first electrode connected to a bottom surface of the PTC layer protrudes from the bottom surface where the through hole of the PTC layer is located, and a convex section is connected to the end electrode of the unit cell.

8. The PTC device according to claim 6 wherein the first electrode connected to a bottom surface of the PTC layer protrudes from the bottom surface where the through hole of the PTC layer is located, and a convex section is connected to the end electrode of the unit cell.

9. A battery pack comprising a plurality of unit cells placed side by side in parallel and a PTC device for protecting the unit cells from overcurrents connected in series to the unit cells, such connection being made by connecting a first electrode and a second electrode, which are connected to both surfaces of a PTC layer, to end electrodes of two unit cells which are positioned on the same flat plane, the battery pack being characterized by:

the unit cells being rectangular cells, an outer shape of the PTC layer being formed to a shape covering almost the entirety of end surfaces of the two unit cells to which the first electrode and the second electrode are connected, and through holes being positioned in the PTC layer against the end electrodes of the unit cells, the first electrode and the second electrode connected to the PTC layer being formed to an outer shape almost the same as the outer shape of the PTC layer, and the first electrode and the second electrode being connected to the end electrodes of the unit cells at points where the through holes of the PTC layer are located.

10. A battery pack comprising a plurality of unit cells placed side by side in parallel and a PTC device for protecting the unit cells from overcurrents connected in series to the unit cells, such connection being made by connecting a first electrode and a second electrode, which are connected to both surfaces of a PTC layer, to end electrodes of two unit cells which are positioned on an almost flat plane, the battery pack being characterized by:

an outer shape of the PTC layer being formed to a shape covering almost the entirety of end surfaces of the two unit cells to which the first electrode and the second electrode are connected, and through holes being positioned in the PTC layer against the end electrodes of the unit cells, the first electrode and the second electrode connected to the PTC layer being formed to an outer shape almost the same as the outer shape of the PTC layer, and the first electrode and the second electrode being connected to the end electrodes of the unit cells at points where the through holes of the PTC layer are located.

11. The battery pack according to claim 10 wherein the second electrode connected to a top surface of the PTC layer has a convex section which is inserted into the through hole of the PTC layer, the convex section being connected to the end electrode of the unit cell.

12. The battery pack according to claim 10 wherein the first electrode connected to a bottom surface of the PTC layer protrudes from the bottom surface where the through hole of the PTC layer is located, and a convex section being connected to the end electrode of the unit cell.

13. A battery pack comprising a plurality of unit cells placed side by side in parallel and a PTC device for protecting the unit cells from overcurrents connected in series to the unit cells, such connection being made by connecting a first electrode and a second electrode, which are connected to both surfaces of a PTC layer, to end electrodes of two unit cells which are positioned on an almost flat plane, the battery pack being characterized by:

the unit cells being cylindrical cells, an outer shape of the PTC layer being formed to a shape covering almost the entirety of end surfaces of the two unit cells to which the first electrode and the second electrode are connected, and through holes being positioned in the PTC layer against the end electrodes of the unit cells, the first electrode and the second electrode connected to the PTC layer being formed to an outer shape almost the same as the outer shape of the PTC layer, the first electrode and the second electrode being connected to the end electrodes of the unit cells at points where the through holes of the PTC layer are located, and the outer shapes of the PTC layer, the first electrode and the second electrode being rectangular with corners bevelled to conform with the cylindrical cells.

14. A battery pack comprising a plurality of unit cells placed side by side in parallel and a PTC device for protecting the unit cells from overcurrents connected in series to the unit cells, such connection being made by connecting a first electrode and a second electrode, which are connected to both surfaces of a PTC layer, to end electrodes of two unit cells which are positioned on the same flat plane, the battery pack being characterized by:

the unit cells being cylindrical cells, outer shape of the PTC layer being formed to a shape covering almost the entirety of end surfaces of the two unit cells to which the first electrode and the second electrode are connected, and through holes being positioned in the PTC layer against the end electrodes of the unit cells, the first electrode and the second electrode connected to the PTC layer being formed to an outer shape almost the same as the outer shape of the PTC layer, the first electrode and the second electrode being connected to the end electrodes of the unit cells at points where the through holes of the PTC layer are located, and the outer shapes of the PTC layer, the first electrode and the second electrode being rectangular with corners bevelled to conform with the cylindrical cells.

* * * * *